Dec. 18, 1934.  F. L. RE QUA  1,984,809
ELECTRIC ARC WELDING APPARATUS
Filed Sept. 15, 1930
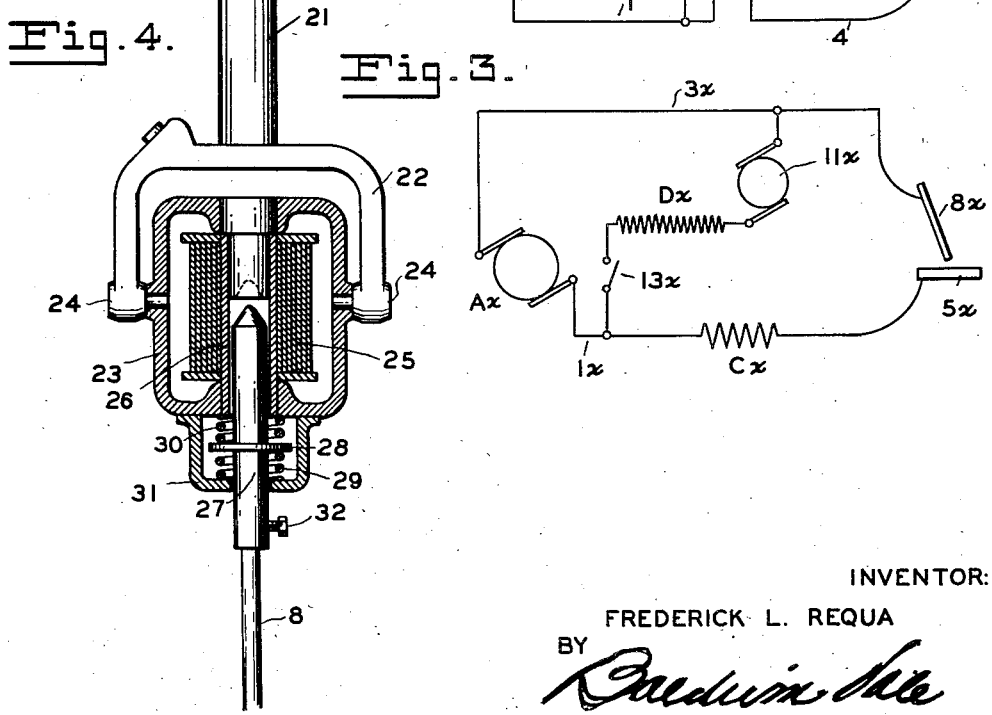
INVENTOR:
FREDERICK L. REQUA
BY
ATTORNEY.

Patented Dec. 18, 1934

1,984,809

UNITED STATES PATENT OFFICE 1,984,809

ELECTRIC ARC WELDING APPARATUS

Frederick L. Re Qua, San Francisco, Calif., assignor to Steel-Weld Equipment Corporation Ltd., San Francisco, Calif., a corporation of California Application September 15, 1930, Serial No. 481,922

8 Claims. (Cl. 219—8)

This invention relates to improvements in electric arc welding apparatus and more particularly to means for causing the length of the welding arc to vary in a periodic manner.

An object of the present invention is to improve the quality of the arc-deposited metal.

Another object is to minimize the effect of the human element in manual arc welding on the quality of the work.

Another object is to provide mechanical control of simple nature, to supplement manual control of the arc length and so reduce the skill and training required of the operator, or to increase the capacity of skilled operators.

Another object is to minimize fatigue of the operator in manual arc welding.

Another object is to improve the efficiency and power factor of alternating current welding systems.

A further object is to render the use of alternating current arc welding less hazardous to the operator.

Another object is to provide mechanical control of simple nature to supplement automatic control of arc length and so simplify the electrode feeding mechanism and increase the reliability of automatic arc welding machines.

Other objects and advantages will appear as the description progresses.

In this specification and the accompanying drawing the invention is disclosed in its preferred form. But it is to be understood that it is not limited to this form, because it may be embodied in other forms. It is also to be understood that in and by the claims following the description it is desired to cover the invention in whatsoever form it may be embodied.

Manual control of the direct current welding arc demands of the operator considerable skill and training to maintain such an arc at its proper length for any extended period of time. It is fatiguing in the extreme.

The major requirement in manually starting the arc is that the tip of the electrode be rapidly "wiped" along the surface of the work piece and as rapidly withdrawn to the proper distance to support the arc. The length of the "wiping" path is of the order of 0.2 inch and the arc length is of the order of 0.1 inch. The motion is complicated by the fact that during the "wipe" the tip of the electrode tends to weld to the surface of the work in consequence of the high current density (of the order of 100,000 amperes per square inch at the point of contact).

When overhead work must be undertaken, the difficulties are so greatly magnified that even among so called "skilled" welders but a small percentage can qualify. This added difficulty arises from the fact that to weld overhead, an extremely short arc must be maintained, so that as the electrode tip melts, the individual molten globules there formed, will contact with the molten crater in the work above at precisely the proper stage of formation, to assure their being drawn therein by surface tension and so removed from the tip. The rate of formation of these globules is high, being of the order of 100 per second, and it is thus that metal is added to the work piece overhead against the force of gravity.

If the operator relaxes his vigilance for an instant during this process and allows the arc length to become too short, the molten tip freezes into the crater in the work above. If he allows the arc to attain a length which would be normal for down-hand welding, the molten globules at the end of the electrode do not contact properly with the molten crater above, so that instead of being removed from the tip by the surface tension effect just mentioned, they are influenced entirely by gravity and either run down the electrode or drop downward from the end. Once these latter actions commence they are difficult to check and generally necessitate removal of the now overheated electrode and substitution of a new one.

A concomitant circumstance of no little importance is the effect of the falling drops of molten metal upon the morale of the operator. Even though he be properly clothed with leather sleeves, apron, etc. there is liability of the dropping hot metal penetrating and setting fire to his clothing or causing small but distracting burns. These circumstances are common and are not regarded as serious by operators, but they do distract from the bodily ease and calmness desirable for the performance of first class welding.

By periodically and continuously varying the length of the arc core, by means of a mechanical electrode vibrator, the act of starting the arc is much simplified. During the wiping process described above the electrode tip is automatically withdrawn after each contact, before it can freeze to the work, due to the congealing of the small particles of molten metal.

Further, after the arc has been started, this vibrating action of the electrode tip tends to eject the weld metal with some force into the work. This agitation of the molten metal serves to exclude gases which would otherwise be entrapped and to give a "working" action which increases the density, uniformity, strength and toughness of the resulting weld metal.

Again, when welding overhead, much more latitude in arc length is allowed the operator and he may consequently accomplish a high grade of work with less skill. A skilled operator may also accomplish a greater output when relieved of the nervous strain of excessively close application.

This advantage in overhead work is due to two causes. The first is the fact that a normal arc length can be tolerated during the formation of a molten globule at the electrode tip, provided that the globule is brought into contact with the liquid spot in the work piece above, at or before the moment it is ready to drop off the electrode. The second is that as the vibrated electrode tip approaches the work, the globule at the end acquires a velocity in the direction of the molten pool above, which velocity tends to carry it on up after the electrode tip has been withdrawn on its return stroke.

Alternating current is preferable for certain kinds of metallic arc welding, but its use has heretofore been restricted by the fact that the ratio of voltage at the source to voltage consumed by the arc has been higher than the corresponding ratio for the direct current arc.

Since for similar welding conditions the voltage across the arc will be substantially the same for both alternating and direct current welding, the source voltage in the former case has heretofore been materially higher than in the latter.

One disadvantage to this condition lies in the fact that an alternating current shock is more severe to the human system than a direct current shock of equal voltage. The welder exposed to the possibility of the relatively higher voltage alternating current shock has therefore in the past been subject to double jeopardy.

Another disadvantage arises from the fact that the useful energy of the arc is proportional to the product of arc voltage by arc current and since the difference between arc and source voltage is consumed by impedance, the greater the source voltage has to be, the lower will be the efficiency and power factor of the welding system.

The electric current across the welding arc is carried by hot vapors, which are conductive by virtue of their high temperature. This temperature maintains at an equilibrium value which will remove the heat energy at precisely the rate at which it is generated by the arc. Consequently when the arc is interrupted and the heat input ceases, the initial rate of temperature decrease is very great and the electrical resistance of the gases in the arc region rises with corresponding rapidity.

In case of the alternating current arc this increase of dielectric strength commences at the end of each alternation as the current passes through its zero value. However, due to the series inductive reactance always associated with the alternating current arc welding system, the voltage wave of the source is nearly 90 electrical degrees in advance of the current wave so that at the instant the arc current passes through zero, the source voltage, now impressed directly across the arc core, is very nearly at its maximum. Hence, if the welding system is to be a stable one, the peak value of the source voltage must be sufficient to reignite the arc after each zero in the current wave.

The minimum ignition voltage which will restart the arc depends upon several factors, among which are the nature and condition of the atmosphere in and around the arc core, the composition of the electrodes and the length of the arc core, the voltage being lower, the shorter the arc.

If, therefore, means are provided to periodically vary the length of the arc core so that as the arc current passes through zero this length will be at or near its minimum, the voltage required to reignite the arc will be materially reduced and thereby the voltage of the source of potential used for such arc welding can be substantially lower than has previously been necessary.

From the above disclosure the frequency of oscillation of the arc core length may be inferred to be twice that of the alternating arc current. This frequency is in general considered preferable but it is to be understood that, as in the case of the direct current arc, I place no limitations upon the frequency of vibration of the electrode, so in the case of the alternating current arc I place no limitations upon the ratio of the frequencies of electrode vibration to supply current.

The vibrating arc principle is also applicable to automatic arc welding apparatus. Automatic metallic arc welding has heretofore been accomplished by providing a small motor to drive the welding electrode feeding means, together with appropriate electrical control to cause the motor speed to vary with the voltage across the arc and to reverse the motor at zero voltage, corresponding to short circuit between the electrode tip and the work. Since the normal arc length is of the order of 0.1 inch and the rate of feed is of the order of one foot a minute, the response of the motor to voltage variation must be very rapid. These two requirements, i. e. high speed and quick response, are possible of fulfillment separately, but to combine them into the same device necessitates a compromise between them and therefore the sacrificing of desired characteristics in one direction or the other.

Further, in striking the arc initially, the motor inertia makes it difficult to withdraw the electrode tip after contact and before freezing between the electrode tip and the work occurs.

By superimposing a mechanical vibratory motion upon the normal action of automatic arc welding heads the initial striking of the arc is accomplished when the electrode tip is at the lowest position in its vibratory stroke. As the tip recedes, the arc is drawn out, giving the motor time to adjust its speed to accommodate the change in circuit conditions.

Thus the present invention provides simple means for assuring the successful striking of the automatically fed arc without danger of freezing the electrode tip to the work, and so makes possible simplification of the electrode feed mechanism and motor control devices in motor fed arc welding machines.

Thus the improvements in the art comprehended in this invention are applicable to manually fed and automatically fed electrode arcs and to alternating and direct current arcs. The vibration of the electrodes may be accomplished in many ways. The mechanism shown and described is merely suggestive and is subject to variation and substitution by those skilled in the art in practicing this invention.

In the one sheet of drawing:

Fig. 1 is a diagrammatic illustration of a motor driven means for reciprocating the welding rod holder.

Fig. 2 is a schematic hookup of an alternating electric circuit for energizing the same, in combination with the welding circuit.

Fig. 3 is a similar diagram for direct current.

Fig. 4 is a modified form of the invention using a magnetic solenoid vibrator as a substitute for the motor in the circuit.

In detail the construction illustrated in the drawing, referring to Fig. 2, comprises a source of alternating welding current A, the current flowing over the wire 1, through the primary 2 of the transformer B, and back to the source over the wire 3.

The secondary current induced in the transformer B flows over the wire 4 to the weld object or work piece 5.

The opposite lead 6 of the transformer passes through the reactance C, thence over the wire 7 to the welding rod 8, which closes the secondary or welding circuit when it contacts the terminal object 5. The direct current hookup is simpler, as shown in Fig. 3, in which the current flows from the generator A$x$, over the wire 1$x$ to the reactance C$x$ to the work piece 5$x$, to the rod 8$x$ and back to the generator over the wire 3$x$. The motor 11$x$ or vibrator 11$x$ is introduced in the generator circuit, ahead of the impedance D$x$.

The welding operation consists in first contacting and then separating the terminals 8—5 a proper distance to maintain the welding arc, the heat of which melts the rod 8 and deposits the molten metal in a crater formed in the terminal object 5, as will hereinafter be more fully described.

The vibratory means shown in Fig. 1 comprises the motor 11, supported by the handle 10. The power cable 12 leads through the handle 10 to the motor. The operation of the motor is controlled by the switch 13 in the power cable and within easy reach of the operator's hand on the handle 10.

The end of the motor shaft is provided with an eccentric or crank pin assembly 14, engaging the connecting rod 15, to impart reciprocating movement thereto.

The holder 17 for the welding rod 8, in this instance, consists of a yoke 16, having the flat spring ends 17', 17', fixed to the opposite sides of the motor casing 9.

The connecting rod 15 is pivotally connected to the yoke 16 at 18, to which it imparts a resilient reciprocating motion, longitudinally of the rod 8, when the switch 13 is closed.

The welding circuit wire 7 in the cable 19 is also carried through the handle 10 from whence it emerges and has a flexible connection 20 with the holder 17. The welding circuit and the motor circuit may be simultaneously controlled by the switch 13, or by independent switches in each circuit.

In alternating current circuits the motor may be introduced into the circuit at any convenient point between the source of current A, and the transformed welding circuit, see Fig. 2.

The modification shown in Fig. 4 accomplishes the same result by different means. The handle 21 is provided with the yoke 22 with the magnet case 23, swiveled therein at 24—24, to permit angular adjustment with respect to the handle.

The case encloses a hollow magnet or solenoid 25 surrounding the guide tube 26. The magnetic core 27 is suspended within this tube and adapted to be alternately attracted and repelled by rapidly energizing and de-energizing the windings 25 in the conventional manner.

The core 27 has the annular flange 28. The springs 29, 30, expand between the casing 23 and the end of the cap 31, respectively, to cushion the thrust of the core 27.

The outer end of the core is recessed to form a chuck to receive the welding rod 8, which is held by the set screw 32.

The mechanisms described above and shown in Figs. 1 and 4 are merely suggestive. The same result may be accomplished by many electrical and mechanical means which will be manifest to those skilled in the art.

Having thus described this invention, what I claim and desire to secure by Letters Patent is:

1. A portable welding rod holder for arc welding apparatus, comprising a frame adapted to be manually held, a motor supported on said frame and having a rotatable shaft, a chuck for gripping the welding rod, means for resiliently holding said chuck on the frame, and means interposed between the motor shaft and resilient holding means for effecting vibration of the chuck and rod upon rotation of the shaft.

2. A portable welding rod holder for arc welding apparatus comprising a frame adapted to be manually held, a chuck for gripping and supporting the welding rod adjacent the work to be welded, means for resiliently supporting said chuck on the frame, and electromagnetic means mounted on said frame for effecting vibration of the chuck and rod.

3. An electric arc welding apparatus comprising an alternating current arc welding circuit including a welding rod, means for supporting the rod adjacent the work to be welded, and means adapted to vibrate the rod in synchronism with the current alternations.

4. An electric arc welding apparatus comprising an alternating current arc welding circuit including a welding rod, means for supporting the rod adjacent the work to be welded, and electro-magnetic means adapted to vibrate the rod in synchronism with the current alternations.

5. An electric arc welding apparatus comprising an alternating current arc welding circuit including a welding rod, means for supporting the rod adjacent the work to be welded, and electro-magnetic means adapted to vibrate the rod longitudinally of its axis in synchronism with the current alternations.

6. An electric arc welding apparatus comprising an alternating current arc welding circuit including a welding rod, means for supporting the rod adjacent the work to be welded, and electro-magnetic means adapted to vibrate the rod longitudinally of its axis at a frequency bearing an odd integral ratio to the frequency of reversal of the alternating arc current.

7. An electric arc welding apparatus comprising an alternating current arc welding circuit including a welding rod, means for supporting the rod adjacent the work to be welded, and electro-magnetic means in said welding circuit adapted to vibrate the rod longitudinally of its axis, whereby the frequency thereof is such that a minimum length of arc recurs periodically at substantially the same instant the voltage across the arc reaches its maximum value.

8. An electric arc welding apparatus comprising an alternating arc welding circuit including a welding rod, means for supporting the rod adjacent the work to be welded, and means adapted to vibrate the rod in synchronism with the current alternations whereby maximum application of the arc is effected between the rod and the work.

FREDERICK L. RE QUA.